United States Patent
Jiang

(10) Patent No.: US 9,680,769 B2
(45) Date of Patent: Jun. 13, 2017

(54) METHOD FOR IMPLEMENTING E-TREE SERVICE AND PROVIDER EDGE DEVICE

(71) Applicant: Huawei Technologies Co., Ltd., Shenzhen, Guangdong (CN)

(72) Inventor: Yuanlong Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 14/319,306

(22) Filed: Jun. 30, 2014

(65) Prior Publication Data

US 2014/0321472 A1 Oct. 30, 2014

Related U.S. Application Data

(63) Continuation of application No. PCT/CN2012/079164, filed on Jul. 26, 2012.

(30) Foreign Application Priority Data

Dec. 30, 2011 (CN) .......................... 2011 1 0455729

(51) Int. Cl.
*H04L 12/933* (2013.01)
*H04L 12/46* (2006.01)

(52) U.S. Cl.
CPC ............ *H04L 49/15* (2013.01); *H04L 12/462* (2013.01); *H04L 12/4625* (2013.01); *H04L 12/4641* (2013.01)

(58) Field of Classification Search
CPC ..... H04L 12/44; H04L 12/46; H04L 12/4625; H04L 12/4641; H04L 45/16; H04L 45/50; H04L 45/66; H04L 45/68

See application file for complete search history.

(56) References Cited

U.S. PATENT DOCUMENTS 8,724,629 B1 * 5/2014 Goli .................... H04L 12/4625
370/392
2006/0245436 A1 11/2006 Sajassi
(Continued)

FOREIGN PATENT DOCUMENTS

CN 101505227 A 8/2009
CN 102170385 A 8/2011
(Continued)

OTHER PUBLICATIONS

"MEF Technical Specification, MEF 6.1, Ethernet Services Definitions—Phase 2," pp. 1-54, Metro Ethernet Forum, Los Angeles, California (Apr. 2008).
(Continued)

*Primary Examiner* — Pao Sinkantarakorn
(74) *Attorney, Agent, or Firm* — Leydig, Voit & Mayer, Ltd.

(57) ABSTRACT

The present invention discloses a method for implementing an E-tree service and a provider edge device, and relates to the field of network communications technologies. A local PE device obtains leaf PE attribute information of a peer provider edge PE device; when the leaf PE attribute information of the peer PE device indicates that the peer PE device is a leaf PE device and the local PE device is a leaf PE device, the local PE device forbids a pseudo-wire connection between the local PE device and the peer PE device. The technical solution of the present invention implements effective isolation between leaf nodes supporting an E-Tree service and therefore implements the E-Tree service in a VPLS network.

18 Claims, 7 Drawing Sheets

(56) References Cited

U.S. PATENT DOCUMENTS

2011/0292937 A1 12/2011 Gupta et al.
2012/0300784 A1 11/2012 Jiang
2013/0003607 A1* 1/2013 Kini .................. H04L 45/66
370/256

FOREIGN PATENT DOCUMENTS

| CN | 102238028 A | 11/2011 |
|---|---|---|
| WO | WO 2011103764 A1 | 9/2011 |

OTHER PUBLICATIONS

Delord et al, "Control Word Reserved bit for use in E-Tree," Network Working Group, Internet Draft, pp. 1-9, Internet Society, Reston, Virginia (Jan. 22, 2010).
Key et al, "Extension to VPLS for E-Tree," Network Working Group, Internet Draft, pp. 1-26, Internet Society, Reston, Virginia (Jan. 22, 2010).
Jiang, "VPLS PE Model with E-Tree Support," Network Working Group, Internet Draft, pp. 1-14, Internet Society, Reston, Virginia (Mar. 1, 2010).
Cao, "Extension to BGP-VPLS for E-Tree," Network Working Group, Internet Draft, pp. 1-11, Internet Society, Reston, Virginia (Apr. 15, 2011).
Cao, "Extension to signaling in VPLS for E-Tree," Network Working Group, Internet Draft, pp. 1-18, Internet Society, Reston, Virginia (May 10, 2011).
Ram et al., "Extension to LPD-VPLS for E-Tree Using Two PW," Network Working Group, Internet Draft, pp. 1-9, Internet Society, Reston, Virginia (May 18, 2011).
Jiang et al., "VPLS PE Model for E-Tree Support," Network Working Group, Internet Draft, pp. 1-21, Internet Society, Reston, Virginia (Oct. 26, 2011).
Jiang et al., "VPLS PE Model for E-Tree Support," Network Working Group, Internet Draft, pp. 1-23, Internet Society, Reston, Virginia (Feb. 5, 2013).
Andersson et al., "Framework for Layer 2 Virtual Private Networks (L2VPNs)," Network Working Group, Request for Comments: 4664, pp. 1-44, Internet Society, Reston, Virginia (Sep. 2006).
Kompella et al., "Virtual Private LAN Service (VPLS) Using BGP for Auto-Discovery and Signaling," Network Working Group, Request for Comments: 4761, pp. 1-28, Internet Society, Reston, Virginia (Jan. 2007).
Rosen et al., "Provisioning, Auto-Discovery, and Signaling in Layer 2 Virtual Private Networks (L2VPNs)," Internet Engineering Task Force (IETF), Request for Comments: 6074, pp. 1-32, Internet Society, Reston, Virginia (Jan. 2011).

\* cited by examiner

| Length |
| --- |
| Route identifier or address modifier |
| Provider edge device identifier |
| Label block offset |
| Label block size |
| Label base |

| Length |
|---|
| Route identifier or address modifier |
| Provider edge device identifier |
| Label block offset |
| Label block size |
| Label base |
| Flag word |

FIG. 6b

| Extension type |
|---|
| Encapsulation type |
| Control identifier |
| Maximum transmission unit |
| Root virtual local area network information |
| Leaf virtual local area network information |
| Reserved field |

| Bit | 0 | 1 | 2 | 3 | 4 | 5 | 6 | 7 |
|---|---|---|---|---|---|---|---|---|
| Control identifier | | | 0 | | | Mapping capability indication information | Control word identifier | Identification word |

FIG. 7

METHOD FOR IMPLEMENTING E-TREE SERVICE AND PROVIDER EDGE DEVICE

CROSS-REFERENCE TO RELATED APPLICATIONS

This application is a continuation of International Patent Application No. PCT/CN2012/079164, filed on Jul. 26, 2012, which claims priority to Chinese Patent Application No. 201110455729.4, filed on Dec. 30, 2011, both of which are hereby incorporated by reference in their entireties.

TECHNICAL FIELD

The present invention relates to the field of network communications technologies, and in particular, to a method for implementing an E-tree service and a provider edge device.

BACKGROUND

An E-tree is a type of Ethernet virtual circuit (EVC for short) service defined by the Metro Ethernet Forum (MEF for short) organization. Specifically, the E-Tree has the following features: 1) A relationship between a root node to a leaf node is one-to-many, and a plurality of root nodes may exist; 2) an Ethernet frame of a root node may be sent to any root node and leaf node; and 3) an Ethernet frame of a leaf node may be sent to any root node, but the Ethernet frame of the leaf node cannot be sent to another leaf node, that is, a leaf node cannot be connected to, but needs to be isolated from, another leaf node.

A virtual private LAN service (VPLS for short) is a Layer 2 virtual private network (VPN for short) technology that is constructed on a Multiprotocol Label Switching (MPLS for short) network and used in a virtual Ethernet local area network. The VPLS technology enables users to access an MPLS network simultaneously from a plurality of geographically dispersed points and communicate with each other. Currently, a core network mainly adopts the Internet Protocol (IP for short)/MPLS technology. Therefore, there are more requirements of providing a virtual Ethernet service by using a VPLS, and the VPLS has been deployed quite widely. The VPLS can automatically discover a PE and construct a VPLS network by using the Border Gateway Protocol (BGP for short), which provides great convenience for creating a large-scale VPLS.

In an existing VPLS network, all provider edge (PE for short) devices are fully connected. Therefore, all Ethernet frames, no matter whether they are sent from a root node or a leaf node, reach all other root nodes and leaf nodes, which cannot accomplish effective isolation between leaf nodes supporting an E-Tree service. That is, the existing VPLS network cannot really implement a universal E-Tree service. Especially, when the existing BGP protocol is used for constructing a VPLS network, it is impossible to distinguish whether a customer edge (CE for short) device connected to a PE is a root node or a leaf node, and therefore, information streams between the leaf nodes cannot be restricted.

SUMMARY

Embodiments of the present invention provide a method for implementing an E-tree service and a provider edge device, so as to implement the E-Tree service in a VPLS network. The technical solution is as follows:

A method for implementing an E-tree service, where the method includes:

obtaining leaf PE attribute information of a peer provider edge PE device, where the leaf PE attribute information is used to indicate whether a PE device is a leaf PE device; and when the leaf PE attribute information of the peer PE device indicates that the peer PE device is a leaf PE device and when a local PE device is a leaf PE device, forbidding a pseudo-wire connection between the local PE device and the peer PE device.

A provider edge device, where the device includes a first obtaining module, a detecting module, and an executing module, where:

the first obtaining module is configured to obtain leaf PE attribute information of a peer provider edge PE device, where the leaf PE attribute information is used to indicate whether a PE device is a leaf PE device; and the executing module is configured to, when the leaf PE attribute information of the peer PE device indicates that the peer PE device is a leaf PE device and when a local PE device is a leaf PE device, forbid a pseudo-wire connection between the local PE device and the peer PE device.

Beneficial effects brought by the technical solution provided by the embodiments of the present invention are: by means of implementation of a technical solution where leaf PE attribute information of a peer provider edge PE device is obtained, and a pseudo-wire connection between a local PE device and the peer PE device is forbidden when the leaf PE attribute information of the peer PE device indicates that the peer PE device is a leaf PE device and leaf PE attribute information of the local PE device indicates that the local PE device is a leaf PE device, effective isolation is implemented between leaf nodes supporting an E-Tree service, and therefore the E-Tree service in a VPLS network is implemented.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 6b is a schematic diagram of a format of an extended NLRI message according to Embodiment 2 of the present invention;

FIG. 7 is a schematic diagram of a format of an extended Layer 2 related message according to Embodiment 2 of the present invention;

DESCRIPTION OF EMBODIMENTS

To make the objectives, technical solutions, and advantages of the present invention clearer, the following further describes the embodiments of the present invention in detail with reference to the accompanying drawings.

Figure 1:
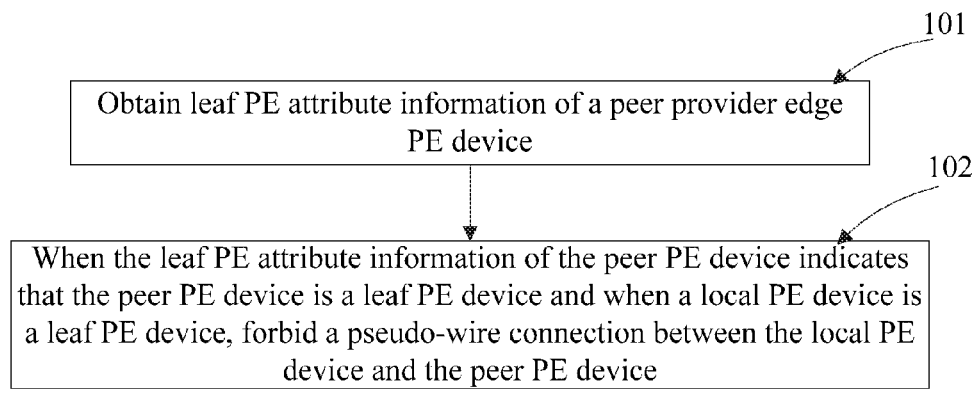
FIG. 1 is a flowchart of a method for implementing an E-tree service according to Embodiment 1 of the present invention.

Referring to FIG. 1, a method for implementing an E-tree service specifically includes the following steps:

Step 101: Obtain leaf PE attribute information of a peer provider edge PE device, where the leaf PE attribute information is used to indicate whether a PE device is a leaf PE device.

In the embodiments of the present invention, a PE device whose ports are all leaf ports is called a leaf PE device, that is, what connected to the leaf PE device are all leaf nodes; a PE device that has a root port is called a non-leaf PE device, that is, at least one root node is connected to the non-leaf PE device.

In the embodiments of the present invention, a leaf port and a root port are pre-configured on the PE device. The leaf port can be connected only to a leaf node, and the root port can be connected only to a root node.

Step 102: When the leaf PE attribute information of the peer PE device indicates that the peer PE device is a leaf PE device and when a local PE device is a leaf PE device, forbid a pseudo-wire connection between the local PE device and the peer PE device.

In this embodiment of the present invention, leaf PE attribute information of a peer provider edge PE device is obtained; when the leaf PE attribute information of the peer PE device indicates that the peer PE device is a leaf PE device and when leaf PE attribute information of a local PE device indicates that the local PE device is a leaf PE device, a pseudo-wire connection between the local PE device and the peer PE device is forbidden. In this way, effective isolation is implemented between leaf nodes supporting an E-Tree service, and therefore the E-Tree service in a VPLS network is implemented.

In the embodiments of the present invention, in a VPLS network architecture, a plurality of E-Tree nodes (root node and leaf node) is connected to a PE device by using an attachment circuit (AC for short), and a plurality of PEs is connected to each other by using a bidirectional pseudo wire (PW for short), where the PW is a virtual connection that is constructed by using an MPLS technology and used for bearing a service, and the nodes may specifically be CE devices.

Figure 2:
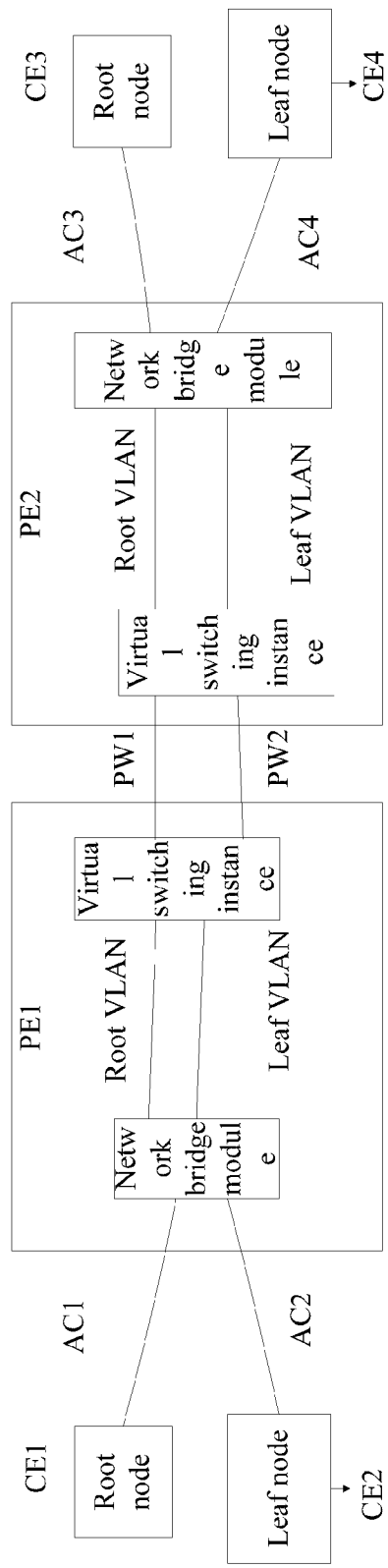
FIG. 2 is a schematic diagram of a VPLS instance according to Embodiment 2 of the present invention.

Referring to FIG. 2, which is a schematic diagram of a VPLS instance according to an embodiment of the present invention, a root node CE1 and a leaf node CE2 are connected to a provider edge device PE1 by using an attachment circuit AC1 and an attachment circuit AC2 respectively, a root node CE3 and a leaf node CE4 are connected to a provider edge device PE2 by using an attachment circuit AC3 and an attachment circuit AC4 respectively, and the PE1 and the PE2 are connected by using a bidirectional pseudo wire PW, where the bidirectional PW is formed of two unidirectional PWs, namely, a pseudo wire PW1 and a pseudo wire PW2.

Referring to FIG. 2, a network bridge module (VLAN Bridge) in a provider edge device adds a corresponding root VLAN or leaf VLAN for a received Ethernet frame or maps a VLAN in a received Ethernet frame to a corresponding root VLAN or leaf VLAN at a port; then, the network bridge module sends the processed Ethernet frame to a virtual switching instance VSI through the root virtual local area network VLAN or the leaf virtual local area network VLAN, and the virtual switching instance VSI forwards the received Ethernet frame to a peer provider edge device through the pseudo wire.

In this embodiment of the present invention, the network bridge module adds the corresponding root VLAN or leaf VLAN for the received Ethernet frame according to a port attribute. If a port that receives the Ethernet frame is a root port, the network bridge module adds the root VLAN for the received Ethernet frame; if the port that receives the Ethernet frame is a leaf port, the network bridge module adds the leaf VLAN for the received Ethernet frame.

In this embodiment of the present invention, the network bridge module maps the VLAN in the received Ethernet frame to the corresponding root VLAN or leaf VLAN according to a port attribute. If a port that receives the Ethernet frame is a root port, the network bridge module maps the VLAN in the received Ethernet frame to the root VLAN; if the port that receives the Ethernet frame is a leaf port, the network bridge module maps the VLAN in the received Ethernet frame to the leaf VLAN.

For example, the network bridge module in the PE1 adds a Root1 VLAN for the CE1 and adds a Leaf1 VLAN for the CE2, and the network bridge module in the PE2 adds a Root2 VLAN for the CE3 and adds a Leaf2 VLAN for the CE4. After either of the network bridge modules sends an Ethernet frame that carries a root VLAN or a leaf VLAN to the VSI (Virtual Switch Instance), the VSI forwards, by using an end-to-end PW, the Ethernet frame that carries the root VLAN or the leaf VLAN to the VSI on the peer PE. After the peer PE receives the Ethernet frame, the network bridge module in the peer PE performs forwarding or filtering according to the VLAN (the root VLAN or the leaf VLAN) in the received Ethernet frame, for example, performs forwarding for the Ethernet frame that carries the root VLAN or performs filtering for the Ethernet frame that carries the leaf VLAN.

Specifically, the CE device serving as the root node and the CE device serving as the leaf node are connected to the network bridge module in the PE through ACs respectively by using a root port and a leaf port that are pre-configured on the PE. An independent port VLAN identifier (Port VLAN ID, PVID) and a member set are configured for each access port on the network bridge module, and the network bridge module is configured with a set of egress ports separately required for forwarding of the root VLAN and the leaf VLAN. When the Ethernet frame enters the network bridge module from a leaf port connected to the leaf node, the Ethernet frame will be tagged with a PVID corresponding to the leaf VLAN, and be forwarded to the root port connected to the root node and finally forwarded to the root node. When the Ethernet frame enters the network bridge module from a root port connected to the root node, the Ethernet frame will be tagged with a PVID corresponding to the root VLAN, and be forwarded to all member sets, that is, forwarded to all leaf nodes and all other root nodes in an E-tree.

In this embodiment of the present invention, an access port refers to a port used for access of an E-tree service to a PE device, a port used for a root node to access the PE device is called a root port, and correspondingly, a port used for a leaf node to access the PE device is called a leaf port In this embodiment of the present invention, the network bridge module configures a member set of an access port according to a regulation in IEEE 802.1. The member set specifically refers to a set of ports in the network bridge module. After receiving an Ethernet frame, the network bridge module can forward the Ethernet frame to all leaf nodes and all root nodes except the root node that sends the Ethernet frame in an E-tree according to ports in the member set. A specific method for configuring the member set and configuration content are the prior art, and details are not described herein again.

For example, when an Ethernet frame from the leaf node CE2 enters the network bridge module in the PE1 through a leaf port on the PE1, the network bridge module maps the VLAN in the Ethernet frame to a leaf VLAN, or adds a leaf VLAN for the Ethernet frame, and then sends the Ethernet frame that carries the leaf VLAN to the VSI of the PE1. Subsequently, the VSI of the PE1 forwards, by using an end-to-end PW, the Ethernet frame that carries the leaf VLAN to the VSI of the peer PE2. After receiving the Ethernet frame that carries the leaf VLAN, the VSI in the peer PE2 forwards the Ethernet frame that carries the leaf VLAN to a corresponding root node through a root port connected to the VSI.

According to features of the E-Tree service, messages need to be isolated between two leaf PEs correlated with the E-Tree service, so as to ensure that the Ethernet frame cannot be transmitted between the two leaf PEs correlated with the E-Tree service. Communication can be performed between a leaf PE device and a non-leaf PE device, and between non-leaf PE devices. Therefore, in a case in which each PE correlated with the E-Tree service uses its own independent VLAN space (for example, the Root1 VLAN is different from the Root2 VLAN and the Leaf1 VLAN is different from the Leaf2 VLAN in FIG. 2), two PE devices correlated with the E-Tree service need to negotiate with each other to perform VLAN mapping and determine a PE device on which the VLAN mapping is performed, so that the two PE devices correlated with the E-Tree service can implement mapping between their VLANs according to VLAN mapping information and implement forwarding of the Ethernet frame.

Therefore, to implement effective isolation between the leaf PE devices correlated with the E-Tree service in the VPLS network and implement VLAN mapping between the PE devices that are correlated with the E-Tree service and can communicate, that is, to implement the method shown in FIG. 1, this embodiment of the present invention puts forward the following technical solution:

The PE (such as PE1 and PE2 in FIG. 2) devices correlated with the E-Tree service exchange a BGP signaling message, where the BGP signaling message may include leaf PE attribute information of the PE devices, VLAN mapping capability indication information, and local VLAN information. The leaf PE attribute information is used to indicate whether a PE device is a leaf PE device, the VLAN mapping capability indication information is used to indicate whether the PE device has a VLAN mapping capability (that is, whether it can perform VLAN mapping for an Ethernet frame), and the VLAN information includes root VLAN information and leaf VLAN information on the PE device. Subsequently, according to the leaf PE attribute information, the VLAN mapping capability indication information, and the VLAN information of the PE device, as well as the leaf PE attribute information, the VLAN mapping capability indication information and the VLAN information of the peer PE device that are received from the peer PE device, the PE device can determine whether to forbid a pseudo-wire connection between the local PE device and the peer PE device and determine whether the PE device itself needs to perform VLAN mapping.

Figure 3:
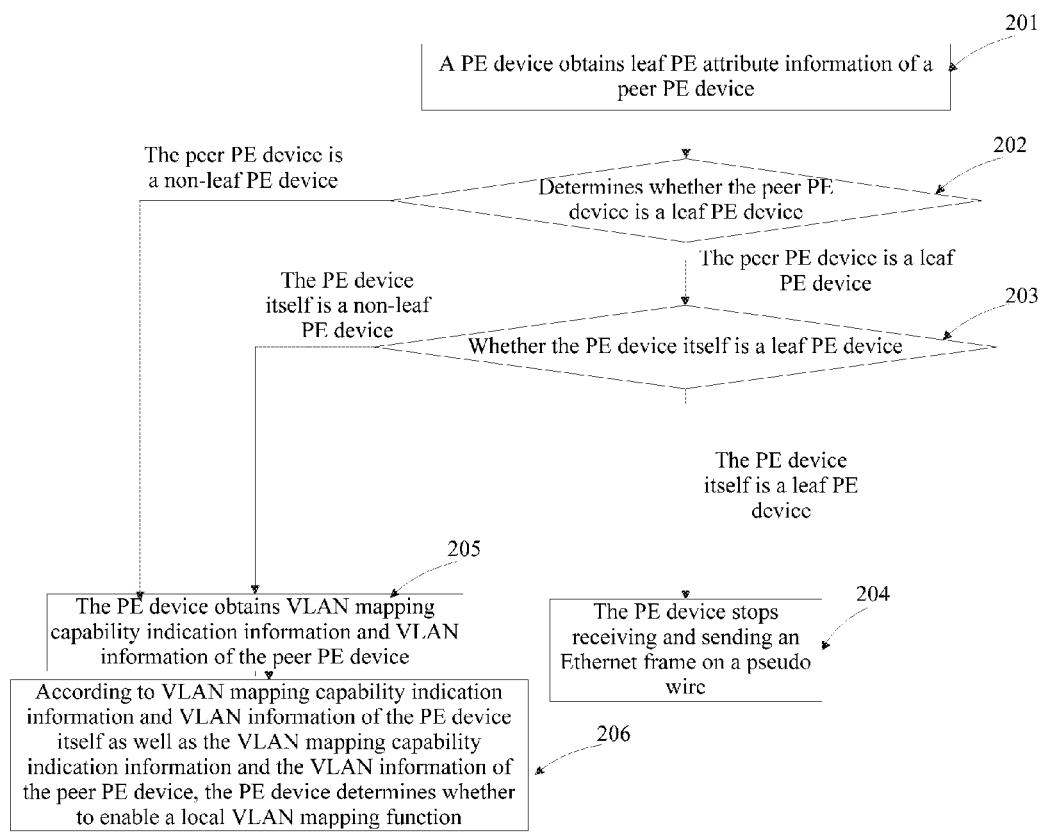
FIG. 3 is a flowchart of a method for implementing an E-tree service according to Embodiment 2 of the present invention.

When each PE device correlated with the E-Tree service constructs a VPLS network based on the existing BGP protocol, in a protocol procedure of the BGP, a BGP message can be exchanged between each PE device correlated with the E-Tree service, where the BGP message includes information such as a VPN identifier of the PE device, and then a PW is established between two PEs by using the BGP protocol according to the exchanged BGP messages. Referring to FIG. 3, a method for implementing an E-tree service by using an extended BGP protocol specifically includes the following operations:

Step 201: A PE device obtains leaf PE attribute information of a peer PE device. In this embodiment of the present invention, the leaf PE attribute information is used to indicate whether a PE device is a leaf PE device. In this embodiment of the present invention, when all E-Tree nodes connected to a PE device are leaf nodes, the PE device is a leaf PE device. Otherwise, when the E-Tree nodes connected to the PE device include at least one root node, the PE device is a non-leaf PE device.

In this embodiment of the present invention, the obtaining of the leaf PE attribute information of the peer PE device by the PE device includes:

receiving, by the PE device, Layer 2 related information that carries the leaf PE attribute information of the peer PE device and is sent by the peer PE device, and parsing the received Layer 2 related information to obtain the leaf PE attribute information of the peer PE device, where the Layer 2 related information specifically refers to Layer 2 related information of the extended BGP protocol.

In this embodiment of the present invention, the PE devices correlated with the E-Tree service in the VPLS network may notify each other of E-Tree attribute information such as their own leaf PE attribute information by using the Layer 2 related information of the extended BGP protocol, where the Layer 2 related information of the BGP protocol may specifically be an extended Layer2 Info Extended Community (Layer 2 related information).

Figure 4A:
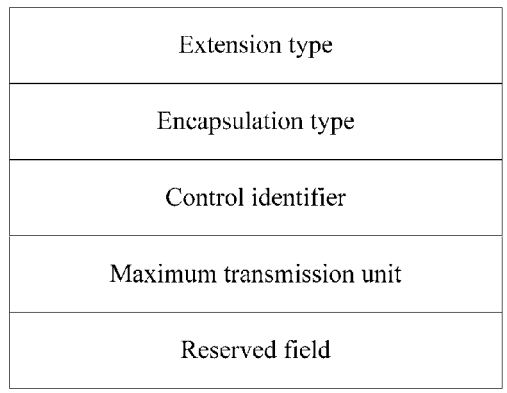
FIG. 4a is a schematic diagram of a format of a Layer 2 related message according to Embodiment 2 of the present invention.

For a message format of the original Layer2 Info Extended Community in the BGP protocol, reference may be made to FIG. 4a. It includes a 2-byte Extended community type (extension type), a 1-byte Encaps Type (encapsulation type), a 1-byte Control Flags (control identifier), a 2-byte Layer-2 MTU (maximum transmission unit), and a 2-byte Reserved (reserved field).

In this embodiment of the present invention, the existing Layer2 Info Extended Community shown in FIG. 4a may be extended to obtain an extended Layer2 Info Extended Community that carries the leaf PE attribute information of the PE device.

In addition, the existing Layer2 Info Extended Community information shown in FIG. 4a may also be extended so that the extended Layer2 Info Extended Community information can not only carry the leaf PE attribute information of the PE device, but also carry VLAN mapping capability indication information and VLAN information of the PE device. The VLAN mapping capability indication information of the PE device is used to indicate whether the PE device has a VLAN mapping capability. The PE device can configure correspondence between a VLAN on the local PE device and a VLAN on the peer PE device only when the PE device has the VLAN mapping capability. The VLAN information includes root VLAN information and leaf VLAN information of the PE device.

Figure 4B:
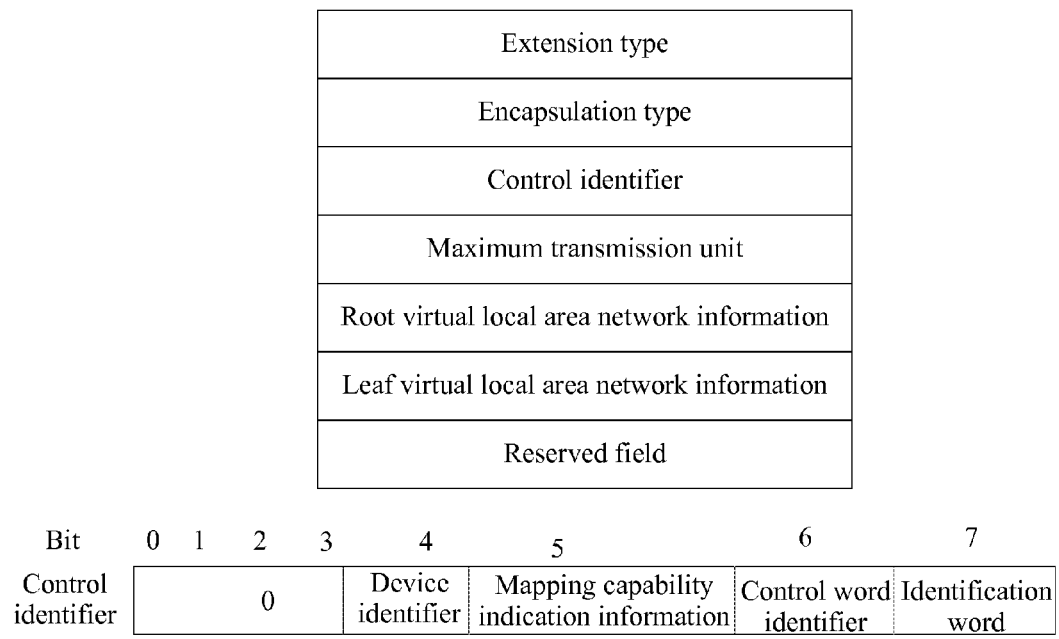
FIG. 4b is a schematic diagram of a format of an extended Layer 2 related message according to Embodiment 2 of the present invention.

Specifically, for a message format of the extended Layer2 Info Extended Community, reference may be made to FIG. 4b. A device identifier is defined in the Control Flags field of the extended Layer2 Info Extended Community. The device identifier may specifically be a bit P in the Control Flags field, where the bit P is used to indicate whether the PE device is a leaf PE device. For example, if the P is 1, it indicates that the PE device that sends the extended Layer2 Info Extended Community is a leaf PE device; if the P is 0, it indicates that the PE device that sends the extended Layer2 Info Extended Community is a non-leaf PE device.

Further, referring to FIG. 4b, mapping capability indication information may also be defined in the Control Flags field of the extended Layer2 Info Extended Community. The mapping capability indication information may specifically be a bit V in the Control Flags field, where the bit V is used to indicate whether the PE device has a VLAN mapping capability. For example, if the V is 1, it indicates that the PE device that sends the extended Layer2 Info Extended Community has the VLAN mapping capability; if the V is 0, it indicates that the PE device that sends the Layer2 Info Extended Community does not have a VLAN mapping capability.

In addition, referring to FIG. 4b, a control word identifier is also defined in the Control Flags field, where the control word identifier may specifically be a bit C in the Control Flags field, and the bit C is used to mark whether a pseudo-wire packet carries a control word. If the C is 1, it indicates that the pseudo-wire packet carries a control word; if the C is 0, it indicates that the pseudo-wire packet does not carry a control word.

Referring to FIG. 4b, an identification word is also defined in the Control Flags field, where the identification word may specifically be a bit S in the Control Flags field, and the bit S marks whether data plane packets are delivered in sequence. If the S is 1, it indicates that the data plane packets are delivered in sequence; if the S is 0, it indicates that the data plane packets are not delivered in sequence.

It should be noted that, referring to FIG. 4b, other bits in the Control Flags field except the defined bits P, V, C, and S in the Control Flags field must be set to zero.

Further, referring to FIG. 4b, two 2-byte fields, namely, a root virtual local area network Root VLAN and a leaf virtual local area network Leaf VLAN, may be further defined behind a Layer2 MTU field in the extended Layer2 Info Extended Community based on the Layer2 Info Extended Community, where the Root VLAN field and Leaf VLAN field are used to notify the Root VLAN information and the Leaf VLAN information of the PE respectively.

It should be noted that a name and an occurrence order of each field in the extended Layer 2 related information may differ, which does not change the essence of the present invention.

Step 202: The PE device determines whether the peer PE device is a leaf PE device according to the leaf PE attribute information of the peer PE device.

When the leaf PE attribute information of the peer PE device indicates that the peer PE device is a leaf PE device, step 203 is performed.

When the leaf PE attribute information of the peer PE device indicates that the peer PE device is a non-leaf PE device, step 205 is performed.

Step 203: The PE device determines whether the PE device itself is a leaf PE device.

When the PE device itself is a leaf PE device, step 204 is performed.

When the PE device itself is a non-leaf PE device, step 205 is performed.

In this embodiment of the present invention, the determining of whether the PE device itself is a leaf PE device by the PE device includes:

storing, by the PE device, the leaf PE attribute information of the PE device into the PE device when a VPLS network is constructed, so that the PE device can determine whether the PE device itself is a leaf PE device according to the pre-stored leaf PE attribute information; or determining, by the PE device, its own leaf PE attribute in real time according to an attribute of each E-Tree node connected to the PE device itself, and determining that the PE device itself is a leaf PE device if the PE device itself is not connected to a root node, or determining that the PE device itself is not a leaf PE device if the PE device itself is connected to a root node.

Step 204: The PE device stops receiving and sending an Ethernet frame on a pseudo wire established between the PE device and the peer PE device. The operation procedure ends.

In specific implementation of this step, the PE device sets an attribute identification bit of the pseudo wire between the PE device and the peer PE device to indicate unavailability of the pseudo wire. For example, the identification bit of the pseudo wire between the PE device and the peer PE device is set to Down to stop receiving and sending an Ethernet frame on the pseudo wire.

In this way, although a pseudo wire is established between two leaf PE devices correlated with the E-Tree service, the pseudo wire is unavailable. Therefore, the two leaf PE devices correlated with the E-Tree service cannot receive or send an Ethernet frame by using the pseudo wire, and effective isolation is implemented between the two leaf PE devices.

Step 205: The PE device obtains VLAN mapping capability indication information and VLAN information of the peer PE device, where the VLAN information of the peer PE device includes root VLAN information and leaf VLAN information of the peer PE.

In this embodiment of the present invention, the obtaining of the VLAN mapping capability indication information and the VLAN information of the peer PE device by the PE device includes:

receiving Layer 2 related information that carries the VLAN mapping capability indication information and the VLAN information of the peer PE device and is sent by the peer PE device, and parsing the received Layer 2 related information to obtain the VLAN mapping capability indication information and the VLAN information of the peer PE device.

From the description about the extended Layer 2 related information in step 201, it can be learned that the PE devices correlated with the E-Tree service can notify each other of their own VLAN mapping capability indication information and VLAN information by using the extended Layer 2 related information. Therefore, after receiving the extended Layer 2 related information sent by the peer PE device, the PE device can parse the extended Layer 2 related information to obtain the VLAN mapping capability indication information and the VLAN information of the peer PE device.

It should be noted that a name and an occurrence order of each field in the extended Layer 2 related information may differ, which does not change the essence of the present invention.

Step 206: According to the VLAN mapping capability indication information and the VLAN information of the PE device itself as well as the VLAN mapping capability indication information and the VLAN information of the peer PE device, the PE device determines whether to enable a local VLAN mapping function.

This step specifically includes the following operations:

Step 206-1: The PE device performs comparison to check whether the VLAN information of the peer PE device is consistent with the VLAN information of the local PE device.

When the VLAN information of the peer PE device is inconsistent with the VLAN information of the local PE device itself, step 206-2 is performed.

When the VLAN information of the peer PE device is consistent with the VLAN information of the local PE device itself, the local VLAN mapping function is not enabled, and the operation procedure ends.

Step 206-2: The PE device determines whether the local PE device has the VLAN mapping capability according to the VLAN mapping capability indication information of the local PE device.

When the local PE device does not have the VLAN mapping capability, the local VLAN mapping function is not enabled, and the operation procedure ends.

When the local PE device has the VLAN mapping capability, step 206-3 is performed.

Step 206-3: The PE device determines whether the peer PE device has the VLAN mapping capability according to the VLAN mapping capability indication information of the peer PE device.

When the peer PE device has the VLAN mapping capability, step 206-4 is performed.

When the peer PE device does not have the VLAN mapping capability, it is determined to enable the local VLAN mapping function, and the operation procedure ends.

Step 206-4: The PE device determines whether a node ID of the local PE device is less than a pre-obtained node ID of the peer PE device.

If the node ID of the local PE device is less than the node ID of the peer PE device, it is determined to enable the local VLAN mapping function, and the operation procedure ends.

If the node ID of the local PE device is not less than the node ID of the peer PE device, the local VLAN mapping function is not enabled, and the operation procedure ends.

The node ID in this embodiment of the present invention may specifically be an IP address of the PE device.

The leaf PE attribute information of the peer provider edge PE device is obtained; when the leaf PE attribute information of the peer PE device indicates that the peer PE device is a leaf PE device and when the local PE device is a leaf PE device, receiving and sending of an Ethernet frame are stopped on a pseudo wire that has already been established between the PE device and the peer PE device by using the BGP protocol. Therefore, effective isolation is implemented between leaf PEs of the VPLS supporting the E-Tree service, and an existing VPLS network that is constructed based on the BGP protocol may be compatible.

In this embodiment of the present invention, the PE device enables the VLAN mapping function to facilitate replacement of VLAN information inside an Ethernet frame when receiving or sending the Ethernet frame. For example, a local root VLAN or leaf VLAN in a header of the Ethernet frame is replaced with a peer root VLAN or leaf VLAN, or the peer root VLAN or leaf VLAN in the header of the Ethernet frame is replaced with the local root VLAN or leaf VLAN.

The following briefly describes operations performed by a PE device when receiving or sending an Ethernet frame after the local VLAN mapping function is enabled:

after receiving the Ethernet frame sent by the peer PE device, the PE device replaces, by means of mapping, peer VLAN information in the Ethernet frame with VLAN information corresponding to the local PE device; and when sending the Ethernet frame to the peer PE device, the PE device replaces, by means of mapping, local VLAN information in the Ethernet frame with peer VLAN information corresponding to the peer PE device.

In this way, the VLAN mapping capability indication information and the VLAN information of the peer PE device are obtained; according to the VLAN mapping capability indication information and the VLAN information of the local PE device as well as the VLAN mapping capability indication information and the VLAN information of the peer PE device, it is determined whether to enable the local VLAN mapping function. Implementation of such a technical solution may solve a problem of determining whether to perform VLAN mapping.

The foregoing technical solution ensures compatibility with the Ethernet E-Tree service on a data plane without a need to modify a forwarding plane of the Ethernet and the VSI.

Figures 5, 6A:
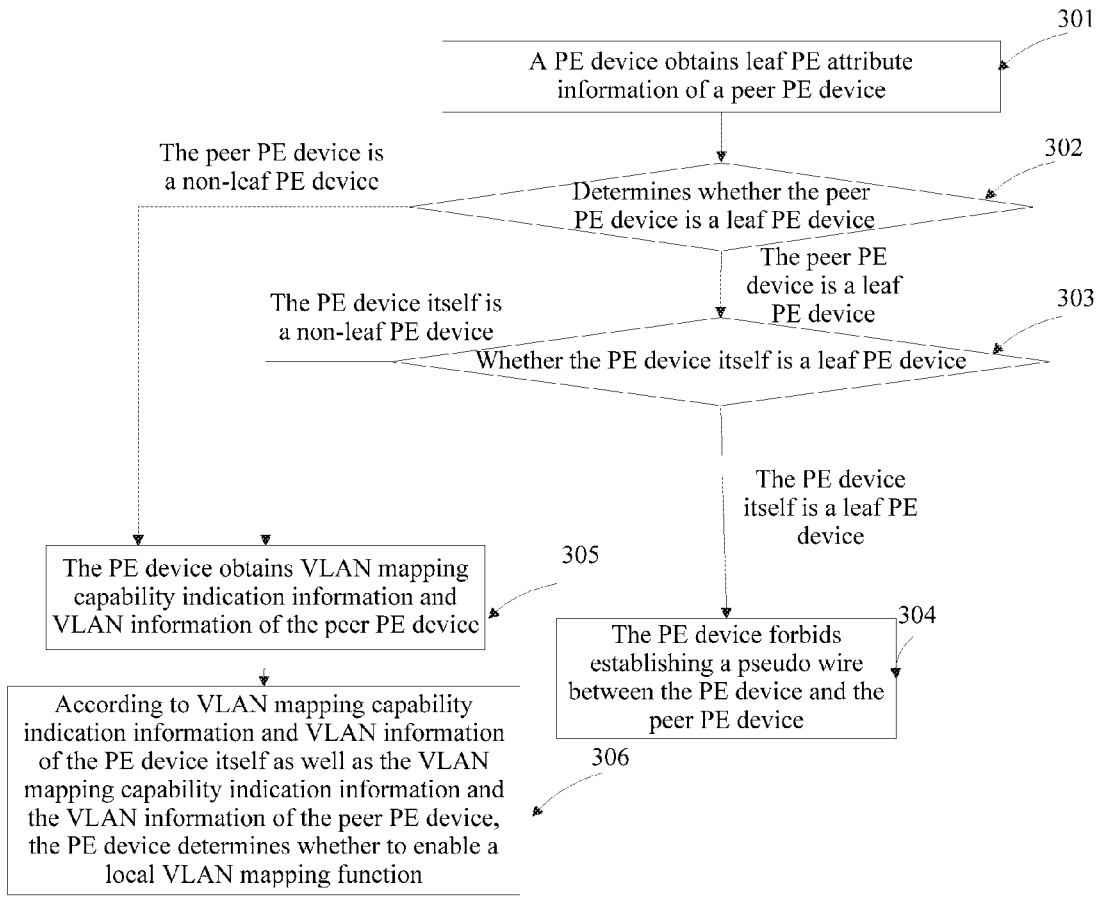
FIG. 5 is a flowchart of a method for implementing an E-tree service according to Embodiment 2 of the present invention.
FIG. 6a is a schematic diagram of a format of an NLRI message according to Embodiment 2 of the present invention.

The following describes, with reference to a specific embodiment, another method for exchanging a BGP message between PEs and dynamically establishing a PW for an E-Tree at the same time, which can also implement isolation between leaf PEs of an E-Tree service. Referring to FIG. 5, a method for implementing an E-tree service specifically includes the following operations:

Step 301: A PE device obtains leaf PE attribute information of a peer PE device. In this embodiment of the present invention, the leaf PE attribute information is used to indicate whether a PE device is a leaf PE device.

In this embodiments of the present invention, the obtaining of the leaf PE attribute information of the peer PE device by the PE device includes:

receiving BGP network layer reachability information that carries the leaf PE attribute information of the peer PE device and is sent by the peer PE device, and parsing the received BGP network layer reachability information to obtain the leaf PE attribute information of the peer PE device.

In this embodiment of the present invention, by extending network layer reachability information (Network Layer Reachability Information, NLRI for short) of the BGP protocol, PE devices correlated with an E-Tree service in a VPLS network notify each other of information such as their own node ID and leaf PE attribute information.

For a message format of the NLRI information, reference may be made to FIG. 6a. It includes 2-byte Length information, 8-byte Route Distinguisher (route identifier or address modifier) information, 2-byte VE ID (ID of the PE device) information, 2-byte VE Block Offset (label block offset) information, 2-byte VE Block Size (label block size) information, and 2-byte Label Base information.

In this embodiment of the present invention, the NLRI information may be extended to obtain extended NLRI that carries the leaf PE attribute information of the PE device. Specifically, for a message format of the extended NLRI information, reference may be made to FIG. 6b. A 1-byte Flag (flag word) is defined behind the Label Base field in the extended NLRI information on the basis of the NLRI information, and a bit P is further defined in the Flag field, where the bit P is used to indicate whether the PE device is a leaf PE device. For example, if the P is 1, it indicates that the PE device that sends the extended NLRI information is a leaf PE device; if the P is 0, it indicates that the PE device that sends the extended NLRI information is a non-leaf PE device.

An occurrence order of each field in the extended NLRI may differ, which does not change the essence of the present invention.

Step 302: The PE device determines whether the peer PE device is a leaf PE device according to the leaf PE attribute information of the peer PE device.

When the leaf PE attribute information of the peer PE device indicates that the peer PE device is a leaf PE device, step 303 is performed.

When the leaf PE attribute information of the peer PE device indicates that the peer PE device is a non-leaf PE device, step 305 is performed.

Step 303: The PE device determines whether the PE device itself is a leaf PE device.

When the PE device itself is a leaf PE device, step 304 is performed.

When the PE device itself is a non-leaf PE device, step 305 is performed.

The method for the PE device to determine whether the PE device itself is a leaf PE device is the same as the method described in step 203, and details are not described herein again.

Step 304: The PE device forbids establishing a pseudo wire between the local PE device and the peer PE device. The operation procedure ends.

In this way, no pseudo wire will be established between two leaf PE devices correlated with the E-Tree service. Therefore, the two leaf PE devices correlated with the E-Tree service cannot receive or send an Ethernet frame, and effective isolation is implemented between the two leaf PE devices.

Step 305: The PE device obtains VLAN mapping capability indication information and VLAN information of the peer PE device, where the VLAN information of the peer PE device includes root VLAN information and leaf VLAN information of the peer PE.

In this embodiments of the present invention, the obtaining of the VLAN mapping capability indication information and the VLAN information of the peer PE device by the PE device includes:

receiving Layer 2 related information that carries the VLAN mapping capability indication information and the VLAN information of the peer PE device and is sent by the peer PE device, and parsing the received Layer 2 related information to obtain the VLAN mapping capability indication information and the VLAN information of the peer PE device.

In this embodiment of the present invention, the Layer 2 related information that carries the VLAN mapping capability indication information and the VLAN information of the peer PE device may specifically be Layer2 Info Extended Community (Layer 2 related information) of the extended BGP. Therefore, the PE devices correlated with the E-Tree service in the VPLS network can notify each other of their own VLAN mapping capability indication information and VLAN information by using the extended Layer2 Info Extended Community information.

For a message format of the Layer2 Info Extended Community, reference may be made to FIG. 4a. The Layer2 Info Extended Community has been described in detail in step 201, and details are not described herein again.

In this embodiment of the present invention, the existing Layer2 Info Extended Community information shown in FIG. 4a may be extended to obtain extended Layer2 Info Extended Community information that includes the VLAN mapping capability indication information and the VLAN information of the PE device, where the VLAN mapping capability indication information of the PE device is used to indicate whether the PE device has a VLAN mapping capability. The PE device can configure correspondence between a VLAN on the local PE device and a VLAN on the peer PE device only when the PE device has the VLAN mapping capability. The VLAN information provides root VLAN information and leaf VLAN information of the PE device.

Specifically, for a message format of the Layer2 Info Extended Community information of the extended BGP, reference may be made to FIG. 7. Compared with FIG. 4b, the extended Layer2 Info Extended Community information in FIG. 7 does not need to carry a device identifier, that is, the flag bit P. Two 2-byte fields, namely, a Root VLAN and a Leaf VLAN, are defined behind a Layer2 MTU field in the Layer2 Info Extended Community, where the Root VLAN field and the Leaf VLAN field are used to notify the Root VLAN information and the Leaf VLAN information of the PE respectively.

It should be noted that an occurrence order of each field in the extended Layer 2 related information may differ, which does not change the essence of the present invention.

Step 306: According to the VLAN mapping capability indication information and the VLAN information of the PE device itself as well as the VLAN mapping capability indication information and the VLAN information of the peer PE device, the PE device determines whether to enable a local VLAN mapping function.

For detailed description about this step, refer to step 206, and details are not described herein again.

The leaf PE attribute information of the peer provider edge PE device is obtained; when the leaf PE attribute information of the peer PE device indicates that the peer PE device is a leaf PE device and when the local PE device is a leaf PE device, if no pseudo wire is established between the local PE device and the peer PE device by using the BGP protocol, no pseudo wire will be established between the local PE device and the peer PE device. Therefore, effective isolation is implemented between leaf nodes supporting the E-Tree service and therefore a universal E-Tree service in a VPLS network is implemented.

In this way, the VLAN mapping capability indication information and the VLAN information of the peer PE device are obtained; according to the VLAN mapping capability indication information and the VLAN information of the local PE device as well as the VLAN mapping capability indication information and the VLAN information of the peer PE device, it is determined whether to enable the local VLAN mapping function. Implementation of such a technical solution may solve a problem of determining whether to perform VLAN mapping.

The foregoing technical solution ensures compatibility with the Ethernet E-Tree service on a data plane without a need to modify a forwarding plane of the Ethernet and the VSI.

Figure 8:
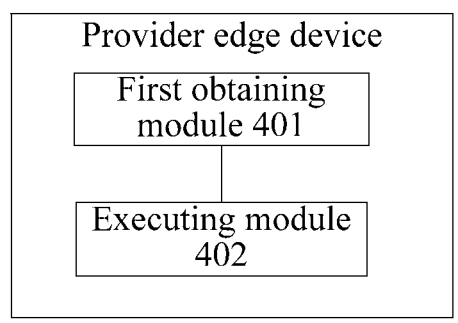
FIG. 8 is a structural block diagram of a provider edge device according to Embodiment 3 of the present invention.

The embodiments of the present invention further provide a provider edge PE device for implementing the foregoing method embodiments of the present invention. Referring to FIG. 8, the device includes a first obtaining module 401 and an executing module 402.

The first obtaining module 401 is configured to obtain leaf PE attribute information of a peer provider edge PE device, where the leaf PE attribute information is used to indicate whether a PE device is a leaf PE device.

The executing module 402 is configured to, when the leaf PE attribute information of the peer PE device indicates that the peer PE device is a leaf PE device and when a local PE device is a leaf PE device, forbid a pseudo-wire connection between the local PE device and the peer PE device.

Specifically, the first obtaining module 401 includes:

a first obtaining unit, configured to receive Layer 2 related information that carries the leaf PE attribute information of the peer PE device and is sent by the peer PE device, and parse the Layer 2 related information to obtain the leaf PE attribute information of the peer PE device; or a second obtaining unit, configured to receive network layer reachability information that carries the leaf PE attribute information of the peer PE device and is sent by the peer PE device, and parse the network layer reachability information to obtain the leaf PE attribute information of the peer PE device.

The executing module 402 is specifically configured to: if a pseudo wire has already been established between the local PE device and the peer PE device by using the Border Gateway Protocol, stop receiving and sending an Ethernet frame on the pseudo wire; or if no pseudo wire is established between the local PE device and the peer PE device by using the border gateway protocol, forbid establishing a pseudo wire between the local PE device and the peer PE device.

Figure 9:
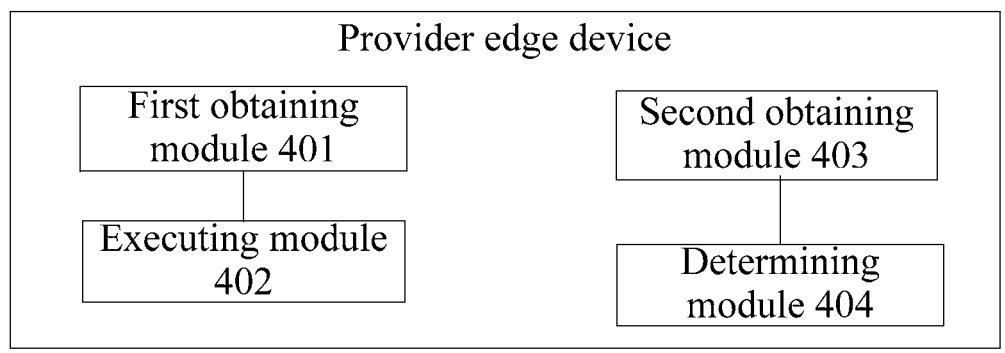
FIG. 9 is a structural block diagram of a provider edge device according to Embodiment 3 of the present invention.

Referring to FIG. 9, in this embodiment of the present invention, the provider edge device shown in FIG. 8 further includes:

a second obtaining module 403, configured to, when the leaf PE attribute information of the peer PE device indicates that the peer PE device is a non-leaf PE device, obtain virtual local area network VLAN mapping capability indication information and VLAN information of the peer PE device; and a determining module 404, configured to determine, according to VLAN mapping capability indication information and VLAN information of the local PE device as well as the VLAN mapping capability indication information and the VLAN information of the peer PE device, whether to enable a local VLAN mapping function.

The second obtaining module 403 is specifically configured to receive Layer 2 related information that carries the VLAN mapping capability indication information and the VLAN information of the peer PE device and is sent by the peer PE device, and parse the Layer 2 related information to obtain the VLAN mapping capability indication information and the VLAN information of the peer PE device.

The determining module 404 is specifically configured to, when the VLAN information of the peer PE device is inconsistent with the VLAN information of the local PE device, the VLAN mapping capability indication information of the local PE device indicates that the local PE device has a VLAN mapping capability and the VLAN mapping capability indication information of the peer PE device indicates that the peer PE device does not have a VLAN mapping capability, determine to enable the local VLAN mapping function; or when the VLAN information of the peer PE device is inconsistent with the VLAN information of the local PE device, the VLAN mapping capability indication information of the local PE device indicates that the local PE device has a VLAN mapping capability and the VLAN mapping capability indication information of the peer PE device indicates that the peer PE device has a VLAN mapping capability, determine whether a node ID of the local PE device is less than a pre-obtained node ID of the peer PE device, and if the node ID of the local PE device is less than the node ID of the peer PE device, determine to enable the local VLAN mapping function.

In this embodiment of the present invention, the leaf PE attribute information of the peer provider edge PE device is obtained; when the leaf PE attribute information of the peer PE device indicates that the peer PE device is a leaf PE device and the leaf PE attribute information of the local PE device indicates that the local PE device is a leaf PE device, in a case in which a pseudo wire between the local PE device and the peer PE device has already been established by using the BGP protocol, receiving and sending of an Ethernet frame are stopped on the pseudo wire, or in a case in which no pseudo wire between the local PE device and the peer PE device is established by using the BGP protocol, no pseudo wire will be established between the local PE device and the peer PE device. In this way, effective isolation is implemented between leaf nodes supporting an E-Tree service and therefore a universal E-Tree service in a VPLS network is implemented.

In addition, the VLAN mapping capability indication information and the VLAN information of the peer PE device are obtained; according to the VLAN mapping capability indication information and the VLAN information of the local PE device as well as the VLAN mapping capability indication information and the VLAN information of the peer PE device, it is determined whether to perform an operation of configuring correspondence between a VLAN on the local PE device and a VLAN on the peer PE device. Implementation of such a technical solution may solve a problem of determining whether to perform VLAN mapping.

The VLAN in the foregoing embodiments may be a C-VLAN, an S-VLAN, a Q-in-Q VLAN, or a B-VLAN defined in IEEE 802.1 series standards.

The foregoing technical solution ensures compatibility with the Ethernet E-Tree service on a data plane without a need to modify a forwarding plane of the Ethernet and the VSI.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disc, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A computer implemented method by a local provider edge (PE) device for implementing an E-tree service, the method comprising:

obtaining, by the local PE device, leaf PE attribute information of a peer PE device;

determining, by the local PE device, whether: the local PE device is a leaf PE device connecting one or more leaf nodes rather than connecting a root node, and the leaf PE attribute information of the peer PE device indicates that the peer PE device is a leaf PE device connecting one or more leaf nodes rather than connecting a root node; and forbidding, by the local PE device, a pseudo-wire (PW) connection between the local PE device and the peer PE device in response to determining that (a) the local PE device is a leaf PE device connecting one or more leaf nodes rather than connecting a root node, and (b) the leaf PE attribute information of the peer PE device indicates that the peer PE device is a leaf PE device connecting one or more leaf nodes rather than connecting a root node; and wherein, in response to determining that the leaf PE attribute information of the peer PE device indicates that the peer PE device is a non-leaf PE device, the method further comprises:

obtaining, by the local PE device, virtual local area network (VLAN) mapping capability indication information and VLAN information of the peer PE device; and determining, by the local PE device, whether to enable a local VLAN mapping function according to VLAN mapping capability indication information and VLAN information of the local PE device as well as the obtained VLAN mapping capability indication information and the VLAN information of the peer PE device.

2. The method according to claim 1, wherein the obtaining the leaf PE attribute information of the peer PE device comprises:

receiving, by the local PE device, Layer 2 related information that carries the leaf PE attribute information of the peer PE device and is sent by the peer PE device, and parsing, by the local PE device, the Layer 2 related information to obtain the leaf PE attribute information of the peer PE device.

3. The method according to claim 1, wherein, if a pseudo wire has already been established between the local PE device and the peer PE device using Border Gateway Protocol, the forbidding the pseudo-wire connection between the local PE device and the peer PE device comprises:

stopping, by the local PE device, receiving and sending an Ethernet frame on the pseudo wire.

4. The method according to claim 1, wherein, if no pseudo wire is established between the local PE device and the peer PE device using Border Gateway Protocol, the forbidding the pseudo-wire connection to the peer PE device comprises:

forbidding, by the local PE device, creating a pseudo wire between the local PE device and the peer PE device.

5. The method according to claim 1, wherein the obtaining the VLAN mapping capability indication information and the VLAN information of the peer PE device comprises:

receiving, by the local PE device, Layer 2 related information sent by the peer PE device; wherein the Layer 2 related information carries the VLAN mapping capability indication information and the VLAN information of the peer PE device, and parsing, by the local PE device, the Layer 2 related information to obtain the VLAN mapping capability indication information and the VLAN information of the peer PE device.

6. The method according to claim 1, wherein the determining, by the local PE device, whether to enable the local VLAN mapping function according to the VLAN mapping capability indication information and the VLAN information of the local PE device as well as the obtained VLAN mapping capability indication information and the VLAN information of the peer PE device comprises:

determining, by the local PE device, to enable the local VLAN mapping function in response to determining that the VLAN information of the peer PE device is inconsistent with the VLAN information of the local PE device, the VLAN mapping capability indication information of the local PE device indicates that the local PE device has a VLAN mapping capability and the VLAN mapping capability indication information of the peer PE device indicates that the peer PE device does not have a VLAN mapping capability.

7. The method according to claim 1, wherein the obtaining the leaf PE attribute information of the peer PE device comprises:

receiving, by the local PE device, network layer reachability information sent by the peer PE device; wherein the network layer reachability information carries the leaf PE attribute information of the peer PE device, and parsing, by the local PE device, the network layer reachability information to obtain the leaf PE attribute information of the peer PE device.

8. The method according to claim 1, wherein the determining, by the local PE device, whether to enable a local VLAN mapping function according to the VLAN mapping capability indication information and the VLAN information of the local PE device as well as the obtained VLAN mapping capability indication information and the VLAN information of the peer PE device comprises:

determining, by the local PE device, whether a node identifier (ID) of the local PE device is less than a pre-obtained node ID of the peer PE device in response to determining that the VLAN information of the peer PE device is inconsistent with the VLAN information of the local PE device, the VLAN mapping capability indication information of the local PE device indicates that the local PE device has a VLAN mapping capability and the VLAN mapping capability indication information of the peer PE device indicates that the peer PE device has a VLAN mapping capability, and determining, by the local PE device in response to the determining that the node ID of the local PE device is less than the node ID of the peer PE device, to enable the local VLAN mapping function.

9. A provider edge (PE) device comprising:

a processor and a non-transitory processor-readable medium having processor-executable instructions stored thereon, the processor-executable instructions including instructions executed by the processor to perform a method comprising:

obtaining leaf PE attribute information of a peer PE device;

determining whether: the PE device is a leaf PE device connecting one or more leaf nodes rather than connecting a root node, and the leaf PE attribute information of the peer PE device indicates that the peer PE device is a leaf PE device connecting one or more leaf nodes rather than connecting a root node; and forbidding a pseudo-wire (PW) connection between the PE device and the peer PE device in response to determining that (a) the PE device is a leaf PE device connecting one or more leaf nodes rather than connecting a root node, and (b) the leaf PE attribute information of the peer PE device indicates that the peer PE device is a leaf PE device connecting one or more leaf nodes rather than connecting a root node; and wherein in response to determining that the leaf PE attribute information of the peer PE device indicates that the peer PE device is a non-leaf PE device, the processor further performs:

obtaining virtual local area network (VLAN) mapping capability indication information and VLAN information of the peer PE device; and determining whether to enable a local VLAN mapping function according to VLAN mapping capability indication information and VLAN information of the PE device as well as the obtained VLAN mapping capability indication information and the VLAN information of the peer PE device.

10. The PE device according to claim 9, wherein the method further comprises:

receiving Layer 2 related information sent by the peer PE device; wherein the Layer 2 related information carries the leaf PE attribute information of the peer PE device, and parsing the Layer 2 related information to obtain the leaf PE attribute information of the peer PE device.

11. The PE device according to claim 9, wherein the method further comprises: stopping receiving and sending an Ethernet frame on a pseudo wire if the pseudo wire has already been established between the PE device and the peer PE device using Border Gateway Protocol.

12. The PE device according to claim 9, wherein the method further comprises: forbidding creating a pseudo wire between the PE device and the peer PE device if no pseudo wire is established between the PE device and the peer PE device using Border Gateway Protocol.

13. The PE device according to claim 9, wherein the method further comprises:

receiving Layer 2 related information sent by the peer PE device; wherein the Layer 2 related information carries the VLAN mapping capability indication information and the VLAN information of the peer PE device, and parsing the Layer 2 related information to obtain the VLAN mapping capability indication information and the VLAN information of the peer PE device.

14. The PE device according to claim 9, wherein determining whether to enable a local VLAN mapping function further comprises:

determining to enable the local VLAN mapping function in response to determining that the VLAN information of the peer PE device is inconsistent with the VLAN information of the PE device, the VLAN mapping capability indication information of the PE device indicates that the PE device has a VLAN mapping capability and the VLAN mapping capability indication information of the peer PE device indicates that the peer PE device does not have a VLAN mapping capability.

15. The PE device according to claim 9, wherein the obtaining further comprises:

receiving network layer reachability information that carries the leaf PE attribute information of the peer PE device and is sent by the peer PE device, and parsing the network layer reachability information to obtain the leaf PE attribute information of the peer PE device.

16. The PE device according to claim 9, wherein determining whether to enable a local VLAN mapping function further comprises:

determining whether a node identifier (ID) of the PE device is less than a pre-obtained node ID of the peer PE device in response to determining that the VLAN information of the peer PE device is inconsistent with the VLAN information of the PE device, the VLAN mapping capability indication information of the PE device indicates that the PE device has a VLAN mapping capability and the VLAN mapping capability indication information of the peer PE device indicates that the peer PE device has a VLAN mapping capability, and determining, in response to determining that the node ID of the PE device is less than the node ID of the peer PE device, to enable the local VLAN mapping function.

17. A provider edge (PE) device comprising:

a processor and a non-transitory processor-readable medium having processor-executable instructions stored thereon, the processor-executable instructions including instructions executed by the processor to perform a method comprises:

obtaining leaf PE attribute information of a peer PE device;

determining whether the PE device is a leaf PE device connecting one or more leaf nodes rather than connecting a root node, and the leaf PE attribute information of the peer PE device indicates that the peer PE device is a leaf PE device connecting one or more leaf nodes rather than connecting a root node; and forbidding a pseudo-wire (PW) connection between the PE device and the peer PE device in response to determining that (a) the PE device is a leaf PE device connecting one or more leaf nodes rather than connecting a root node, and (b) the leaf PE attribute information indicates that the peer PE device is a leaf PE device connecting one or more leaf nodes rather than connecting a root node; and wherein, in response to determining that the local PE device is a non-leaf PE device and the leaf PE attribute information of the peer PE device indicates that the peer PE device is a leaf PE device connecting one or more leaf nodes rather than connecting a root node, the method further comprises:

obtaining virtual local area network (VLAN) mapping capability indication information and VLAN information of the peer PE device; and determining whether to enable a local VLAN mapping function according to VLAN mapping capability indication information and VLAN information of the local PE device as well as the VLAN mapping capability indication information and the VLAN information of the peer PE device.

18. A computer-implemented method by a local provider edge (PE) device for implementing an E-tree service, the method comprising:

obtaining, by the local PE device, leaf PE attribute information of a peer PE device;

determining, by the local PE device, whether the local PE device is a leaf PE device connecting one or more leaf nodes rather than connecting a root node, and the leaf PE attribute information of the peer PE device indicates that the peer PE device is a leaf PE device connecting one or more leaf nodes rather than connecting a root node; and forbidding, by the local PE device, a pseudo-wire (PW) connection between the local PE device and the peer PE device in response to determining that (a) the local PE device is a leaf PE device connecting one or more leaf nodes rather than connecting a root node, and (b) the leaf PE attribute information of the peer PE device indicates that the peer PE device is a leaf PE device connecting one or more leaf nodes rather than connecting a root node;

wherein, in response to determining that (a) the local PE device is a non-leaf PE device and (b) the leaf PE attribute information of the peer PE device indicates that the peer PE device is a leaf PE device connecting one or more leaf nodes rather than connecting a root node, the method further comprises:

obtaining, by the local PE device, virtual local area network (VLAN) mapping capability indication information and VLAN information of the peer PE device; and determining, by the local PE device, whether to enable a local VLAN mapping function according to VLAN mapping capability indication information and VLAN information of the local PE device as well as the VLAN mapping capability indication information and the VLAN information of the peer PE device.

* * * * *